US008744159B2

(12) United States Patent
Bower et al.

(10) Patent No.: US 8,744,159 B2
(45) Date of Patent: Jun. 3, 2014

(54) METHODS, SYSTEMS AND COMPUTER PROGRAM PRODUCTS FOR COLLAPSING VOLUME DATA TO LOWER DIMENSIONAL REPRESENTATIONS THEREOF USING HISTOGRAM PROJECTION

(75) Inventors: Bradley A. Bower, Hillsborough, NC (US); Eric L. Buckland, Hickory, NC (US); Igor Touzov, Cary, NC (US)

(73) Assignee: Bioptigen, Inc., Durham, NC (US)

( * ) Notice: Subject to any disclaimer, the term of this patent is extended or adjusted under 35 U.S.C. 154(b) by 300 days.

(21) Appl. No.: 13/040,923

(22) Filed: Mar. 4, 2011

(65) Prior Publication Data
US 2011/0216956 A1    Sep. 8, 2011

Related U.S. Application Data

(60) Provisional application No. 61/310,954, filed on Mar. 5, 2010.

(51) Int. Cl.
*G06K 9/00* (2006.01)
(52) U.S. Cl.
USPC ............ 382/131; 382/168; 356/479; 600/425
(58) Field of Classification Search
USPC .................... 382/131, 168; 356/479; 600/425
See application file for complete search history.

(56) References Cited

U.S. PATENT DOCUMENTS

| 4,580,219 | A | 4/1986 | Pelc et al. |
| 5,150,421 | A | 9/1992 | Morishita et al. |
| 5,204,627 | A | 4/1993 | Mistretta et al. |
| 5,226,113 | A | 7/1993 | Cline et al. |
| 5,233,299 | A | 8/1993 | Souza et al. |
| 5,297,551 | A | 3/1994 | Margosian et al. |
| 5,368,033 | A | 11/1994 | Moshfeghi |
| 5,760,781 | A | 6/1998 | Kaufman et al. |
| 5,852,646 | A | 12/1998 | Klotz et al. |
| 6,102,864 | A | 8/2000 | Hatfield et al. |
| 6,112,112 | A * | 8/2000 | Gilhuijs et al. ............... 600/425 |
| 6,436,049 | B1 | 8/2002 | Kamiyama et al. |
| 6,459,094 | B1 | 10/2002 | Wang et al. |
| 6,490,335 | B1 | 12/2002 | Wang et al. |
| 6,519,354 | B1 | 2/2003 | Oshio |
| 6,671,538 | B1 | 12/2003 | Ehnholm et al. |
| 6,885,764 | B2 | 4/2005 | Wang et al. |
| 6,904,163 | B1 | 6/2005 | Fujimura et al. |

(Continued)

FOREIGN PATENT DOCUMENTS

WO    WO2004/002298 A1    1/2004

OTHER PUBLICATIONS

Bruckner, Stefan, "Introduction to Scientific Visualization," Simon Fraser University/Vienna University of Technology, Applicants' Admitted Prior Art, 17 pages, (Earlier than this application Mar. 2010).

(Continued)

*Primary Examiner* — Chan Park
*Assistant Examiner* — Eueng-Nan Yeh
(74) *Attorney, Agent, or Firm* — Myers Bigel Sibley & Sajovec

(57) ABSTRACT

Methods of collapsing volume data to a lower dimensional representation of the volume data are provided. The methods include collapsing volume data to a lower dimensional representation of the volume data using histogram projection. Related systems and computer program products are also provided.

19 Claims, 12 Drawing Sheets

(56) References Cited

U.S. PATENT DOCUMENTS

| | | |
|---|---|---|
| 6,907,281 B2 | 6/2005 | Grzeszczuk |
| 7,020,318 B2 | 3/2006 | Oshio et al. |
| 7,170,517 B2 | 1/2007 | Raman et al. |
| 7,301,644 B2 | 11/2007 | Knighton et al. |
| 7,505,142 B2 | 3/2009 | Knighton et al. |
| 7,532,750 B2 | 5/2009 | Sasaki et al. |
| 7,623,736 B2 | 11/2009 | Viswanathan |
| 2001/0036303 A1 | 11/2001 | Maurincomme et al. |
| 2003/0088542 A1* | 5/2003 | McGee et al. ............... 707/1 |
| 2004/0215071 A1 | 10/2004 | Frank et al. |
| 2004/0239938 A1* | 12/2004 | Izatt ............... 356/450 |
| 2005/0018201 A1 | 1/2005 | de Boer et al. |
| 2005/0049478 A1 | 3/2005 | Kuduvalli et al. |
| 2005/0065421 A1 | 3/2005 | Burckhardt |
| 2005/0105828 A1 | 5/2005 | Oosawa |
| 2005/0111720 A1 | 5/2005 | Gurcan et al. |
| 2005/0140984 A1 | 6/2005 | Hitzenberger |
| 2005/0226375 A1 | 10/2005 | Eberhard et al. |
| 2006/0030768 A1 | 2/2006 | Ramamurthy et al. |
| 2007/0002327 A1 | 1/2007 | Zhou et al. |
| 2007/0003117 A1 | 1/2007 | Wheeler et al. |
| 2007/0066880 A1 | 3/2007 | Lee et al. |
| 2007/0291277 A1 | 12/2007 | Everett et al. |
| 2008/0002062 A1* | 1/2008 | Kim et al. ............... 348/602 |
| 2008/0095433 A1* | 4/2008 | Johnson et al. ............... 382/169 |
| 2008/0187095 A1 | 8/2008 | Boone et al. |
| 2010/0027857 A1* | 2/2010 | Wang ............... 382/128 |

OTHER PUBLICATIONS

Choma et al., "Sensitivity advantage of swept source and Fourier domain optical coherence tomography," Optics Express, vol. 11, No. 18, Sep. 8, 2003, 2183-2189.

Dorrer et al., "Spectral resolution and sampling issues in Fourier-transformation spectral interferometry," J. Opt. Soc. Am. B, vol. 17, No. 10, Oct. 2000, 1795-1802.

First Office Action, Chinese Patent Application No. 200680036611.5, Aug. 20, 2010, 27 pages.

Häusler et al., "'Coherence Radar' and 'Spectral Radar'—New Tools for Dermatological Diagnosis," Journal of Biomedical Optics, vol. 3, No. 1, Jan. 21-31, 1998.

Heidrich et al., "Interactive Maximum Projection Volume Rendering," Sixth IEEE Visualization 1995 (VIS '95), Oct. 29-Nov. 3, 1995, 1 page.

Hylton, Nola M., "Angiographic display method for flow-enhanced MRI", Abstract, Publication Date Jun. 1992, http://adsabs.harvard.edu/abs/1992SPIE.1652.107H, 2 pages.

International Search Report and Written Opinion for PCT/US2006/029535; Date of mailing: Aug. 22, 2007.

Jiao et al., "Simultaneous acquisition of sectional and fundus ophthalmic images with spectral-domain optical coherence tomography," Optics Express, Vo. 13, No. 2, Jan. 24, 2005, 444-452.

Jiao et al., "Registration of high-density cross sectional images to the fundus image in spectral-domain ophthalmic optical coherence tomography" Optics Express, vol. 14, No. 8, Apr. 17, 2006, 3368-3376.

Kaufman et al., "Real-Time Volume Rendering," to appear in the International Journal of Imaging Systems and Technology, special issue on 3D Imaging, Center for Visual Computing (CVC) and Department of Computer Science, State University of New York at Stony Brook, Applicants' Admitted Prior Art, 9 pages, (Earlier than this application Mar. 2010).

Srinivasan et al. "Three-dimensional retinal imaging with ultrahigh resolution, Fourier/spectral domain optical coherence tomography" Proc. of SPIE 5688(1):90-99 (2005), (Earlier than this application Mar. 2010).

Totsuka et al., "Frequency Domain Volume Rendering," Sony Corporation, Applicants' Admitted Prior Art, pp. 271-278, (Earlier than this application Mar. 2010).

Computing (CVC) and Department of Computer Science, State University of New York at Stony Brook, Applicants' Admitted Prior Art, 9 pages, (published before this application Mar. 2010).

Leitgeb et al., "Performance of fourier domain vs. time domain optical coherence tomography," Optics Express, vol. 11, No. 8, Apr. 21, 2003, 889-894.

Mahmoud et al. "Comparison of three methods for registration of abdominal/pelvic volume data sets from functional-anatomic scans" Proc. of SPIE, vol. 3979, 1378-1386 2000), (published before this application Mar. 2010).

Srinivasan et al. "Three-dimensional retinal imaging with ultrahigh resolution, Fourier/spectral domain optical coherence tomograpy ", Proc. of SPIE 5688(1):90-99 (2005), (published before this application Mar. 2010).

Tan-no et al., "Optical multimode frequency-domain reflectometer," Optics Letters, vol. 19, No. 8, Apr. 15, 1994, 587-589.

Totsuka et al., "Frequency Domain Volume Rendering," Sony Corporation, Applicants' Admitted Prior Art, pp. 271-278, (published before this application Mar. 2010).

Yun et al., "High-speed spectral-domain optical coherence tomography at 1.3 µm wavelength," Optics Express, vol. 11, No. 26, Dec. 29, 2003, 3598-3604.

Office Action, Japanese Patent Application No. 2008-525059, May 8, 2012.

Ferguson et al., "Tracking Optical Coherence Tomography," Optics Letters 29(18), pp. 2139-2141, Sep. 15, 2004.

\* cited by examiner

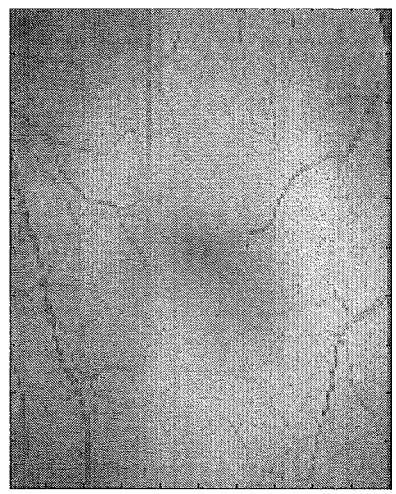
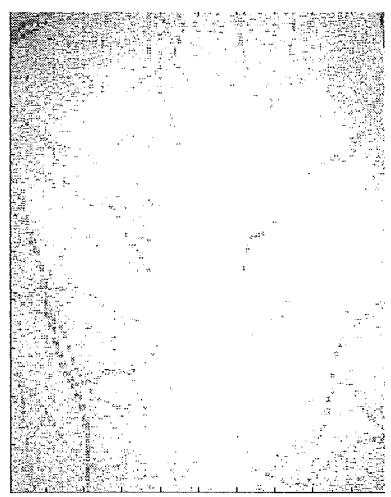
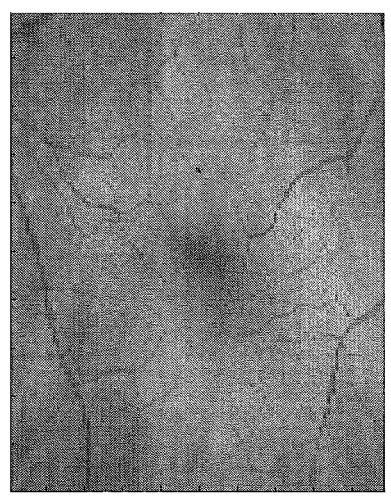
Figure 1

Figure 7
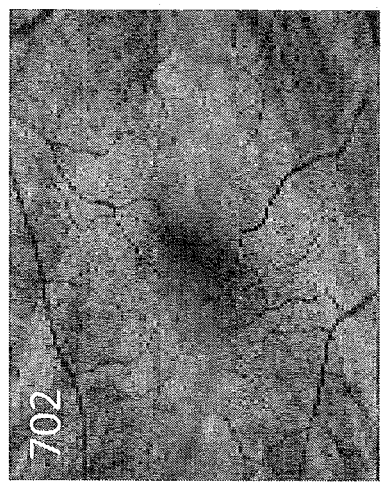
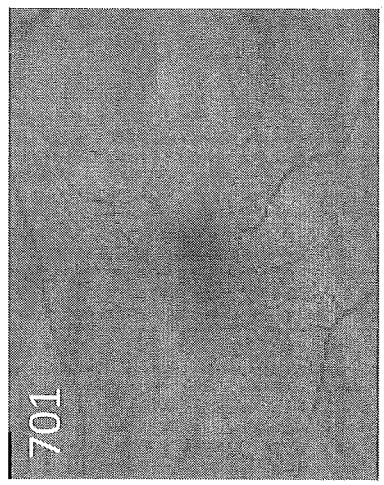
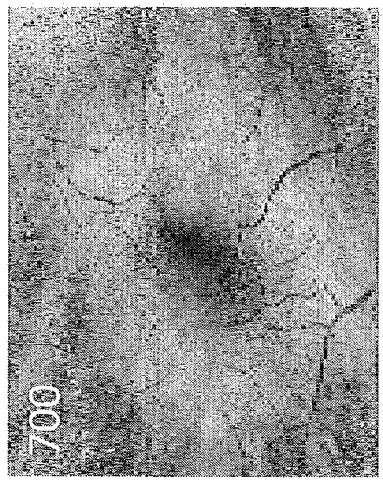

METHODS, SYSTEMS AND COMPUTER PROGRAM PRODUCTS FOR COLLAPSING VOLUME DATA TO LOWER DIMENSIONAL REPRESENTATIONS THEREOF USING HISTOGRAM PROJECTION

CLAIM OF PRIORITY

The present application claims priority to U.S. Provisional Application No. 61/310,954, filed Mar. 5, 2010, the disclosure of which are hereby incorporated herein by reference as if set forth in its entirety.

FIELD

The present inventive concept relates generally to imaging systems and, more particularly, to methods and systems for collapsing three or more dimensional data to a lower dimensional representation for visualization or data analysis purposes.

BACKGROUND

The use of projection methods to represent three dimensional and higher dimensional data sets as a two dimensional image representation is necessary for display of image data from multiple modalities, including, for example, magnetic resonance imaging (MRI), computed tomography (CT), ultrasound, and optical coherence tomography (OCT). The use of the average intensity projection (AIP), in which the average value along a ray cast through a data set is used to represent one pixel of the two dimensional plane, and the maximum intensity projection (MIP), in which the maximum value along a ray cast through a data set is used to represent one pixel of the two dimensional plane, are well known and well documented. For example, AIP and MIP are discussed in, for example, *Method and apparatus for volumetric projection rendering using reverse ray casting* to Cline et al. (USPTO, ed. (General Electric Company, USA, 1993), p. 9), *Three-dimensional ultrasound imaging of velocity and power data using average or median pixel projections* to Hatfield et al. (USPTO, ed. (General Electric Company, USA, 2000), p. 17) and *Projection methods for producing two-dimensional images from three-dimensional data* to Souza et al. (USPTO, ed. (General Electric Company, USA, 1993), p. 11). FIGS. 1A through 1C illustrate results obtained using standard projection methods, AIP; MIP; standard deviation projection, respectively.

SUMMARY

Some embodiments of the present inventive concept provide methods of collapsing volume data to a lower dimensional representation of the volume data. The methods include collapsing volume data to a lower dimensional representation of the volume data using histogram projection.

In further embodiments of the present inventive concept, the histogram may be calculated by counting the number of pixel values $p(x,z)$ that fall into unique bins and/or subsets of pixel values, wherein a lowest value of a first bin is zero and a largest value of a last bin is a maximum value in a data set being analyzed. A cumulative distribution function (CDF) may be calculated from the histogram and the pixel value used in the projection may be selected based on the calculated CDF.

In still further embodiments, a 50 percent CDF value may represent a median intensity value.

In some embodiments, the CDF may represent a total number of integrated counts across multiple intensity levels and fractions of the CDF maximum value may be used to weight the projection to highlight high or low intensity regions within the volume data.

In further embodiments, integrated ranges or aggregations of multiple ranges may be used along the CDF to generate a value $P(x,y)$ in a projection map.

In still further embodiments, virtual A-Scans may be generated based on adjacent A-Scans in 1 or more dimensions, the virtual A-Scans being an aggregate of information from multiple locations to provide regional pixel information.

In some embodiments, clusters of two or more A-Scans may be examined and the examined clusters may be filtered to generate a unique A-Scan composed of the filter value from all A-Scans in the examined clusters at each depth location. An average intensity along each A-Scan $A(x,z)$ may be calculated to generate a pixel value $P(x,y)$ for each location in the projection map.

In further embodiments, the integrated ranges or aggregations of multiple ranges may be used along the CDF generated from filtered A-Scans to generate a value in a projection map $P(x,y)$.

In still further embodiments, virtual A-Scans may be generated based on angular projects through the volume, the virtual A-Scans being an aggregate of the information contained along each projection angle.

In some embodiments, an average intensity may be calculated along each A-Scan $A(x,z)$ to generate a value $P(x,y)$ for each location in the projection map. Integrated ranges or aggregations of multiple ranges may be used along the CDF generated from virtual A-Scans to generate a value in a projection map $P(x,y)$.

In further embodiments, a unique A-Scan representing region information in both the lateral and elevation dimensions may be generated based on multiple A-Scans in a two dimensional region around a geographically or temporally unique A-Scan.

Still further embodiments of the present inventive concept provide systems for collapsing volume data to a lower dimensional representation of the volume data. The system includes an optical coherence tomography system; and a volume data processor coupled to the optical coherence tomography system, the volume data processor being configured to collapse volume data to a lower dimensional representation of the volume data using histogram projection.

In some embodiments, the optical coherence tomography system may be a spectral domain optical coherence tomography system. The spectral domain coherence tomography system may include a reference arm; a sample arm coupled to the reference arm and the communications device, the sample arm configured to scan a sample; and an optical coherence tomography engine coupled to the communications device.

Further embodiments of the present inventive concept provide computer program products for collapsing volume data to a lower dimensional representation of the volume data. The computer program product includes computer readable storage medium having computer readable program code embodied in said medium. The computer readable program code includes computer readable program code configured to collapse volume data to a lower dimensional representation of the volume data using histogram projection.

BRIEF DESCRIPTION OF THE DRAWINGS

FIG. 1 includes exemplary images obtained using Average Intensity Projection (ATP), Maximum Intensity Projection (MIP) and Standard Deviation projection.

FIG. 7 illustrates diagrams illustrating a Histogram-centroid projection; a Median projection; and a 75% of CDF maximum projection.

DETAILED DESCRIPTION

Figure 2:
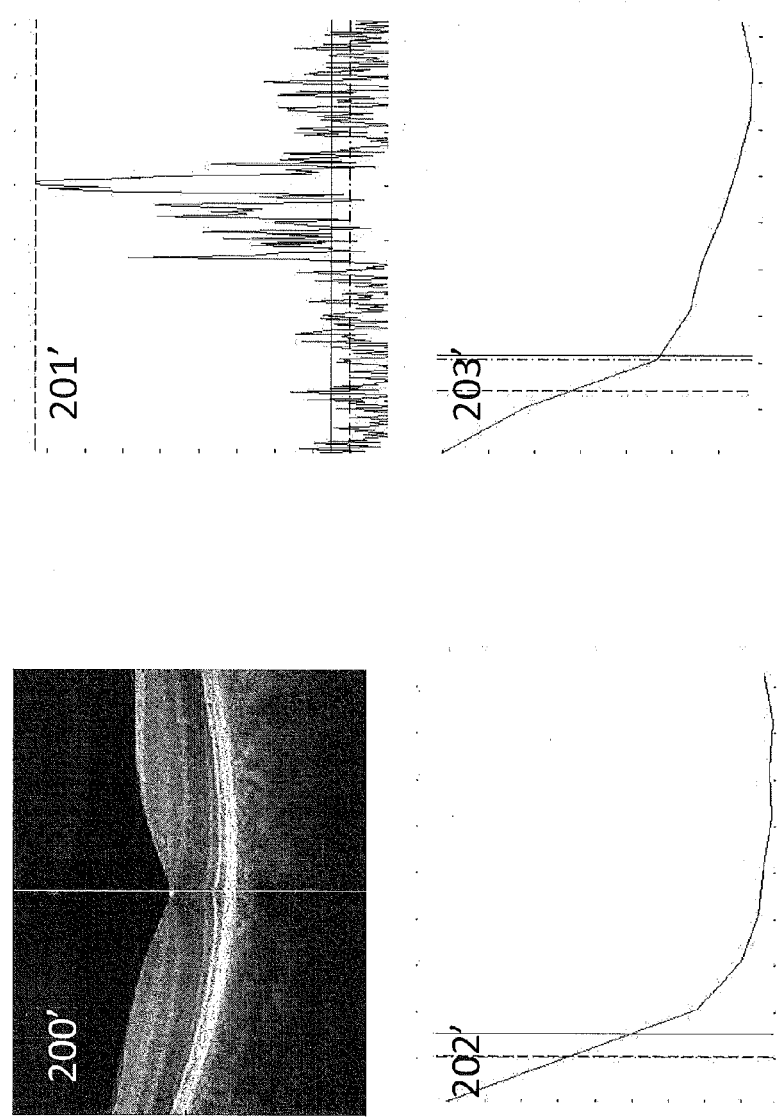
FIG. 2 illustrates graphs showing histograms of a single 1D line and of a 2D frame of retinal SDOCT data evaluated for N=10 histogram bins, Image data; 1D line of data from the indicated position in 200 with the max, mean, and median marked; histogram of the 1D line with the mean, median, and centroid of the 1D histogram indicated; and histogram of the 2D image data with the mean, median, and centroid of the histogram of the frame of data indicated.

Specific exemplary embodiments of the inventive concept now will be described with reference to the accompanying drawings. This inventive concept may, however, be embodied in many different forms and should not be construed as limited to the embodiments set forth herein; rather, these embodiments are provided so that this disclosure will be thorough and complete, and will fully convey the scope of the inventive concept to those skilled in the art. The terminology used in the detailed description of the particular exemplary embodiments illustrated in the accompanying drawings is not intended to be limiting of the inventive concept. In the drawings, like numbers refer to like elements.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Volume data must often be collapsed to a lower dimensional representation for visualization and/or data analysis purposes. As used herein, "volume data" refers to three dimensional or higher dimensional data. As discussed above, many conventional methods for representation exists. As illustrated in FIG. 1, exemplary images obtained using Average Intensity Projection (AIP) 100, Maximum Intensity Projection (MIP) 101 and Standard Deviation projection 102 are illustrated. Some embodiments of the present inventive concept include representations using histogram-based methods, referred to herein as "histogram projection," for collapsing volume data to lower dimensional data as will be discussed herein with respect to FIGS. 2 through 12.

FIGS. 2 through 10 will be summarized. FIG. 2 is used herein to do a histogram evaluation. To investigate the utility of histogram-based approaches to the projection, the histogram of a single one dimensional (1D) line and of a two dimensional (2D) frame of retinal SDOCT data was evaluated for N=10 histogram bins. It will be understood that histogram binning uses counts of samples in certain ranges instead of a sum or integral which is used in many other techniques. Image 200' illustrates image data; Image 201' illustrates a one-dimensional (1D) line of data from the indicated position in 200' with the max (dash), mean (solid), and median (dot-dash) marked; Image 202' illustrates a histogram of the 1D line with the mean (solid), median (dash), and centroid (dot-dash) of the 1D histogram indicated; and Image 203' illustrates a histogram of the two-dimensional (2D) image data with the mean (solid), median (dash), and centroid (dot-dash) of the histogram of the frame of data indicated.

Figure 3:
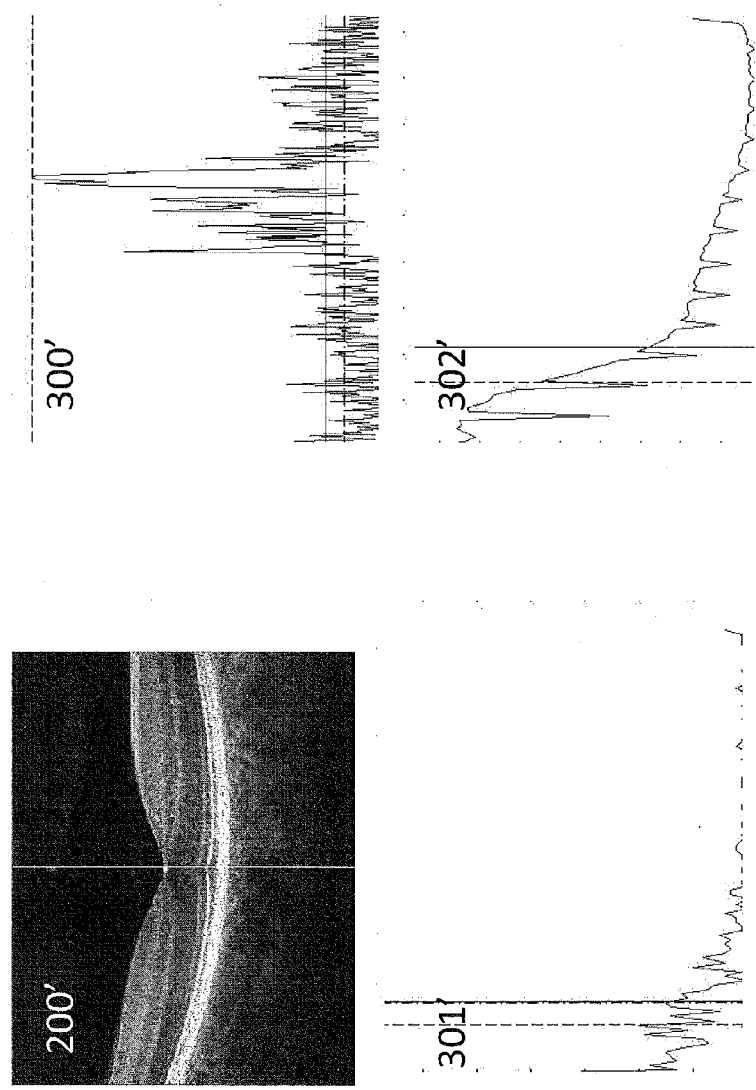
FIG. 3 illustrates graphs showing histograms similar to those illustrated in FIG. 2, however in FIG. 3, N=100 histogram bins.

The images illustrated in FIG. 3 are also used in the histogram evaluation. The images illustrated in FIG. 3 are similar to the images 200'-203' in FIG. 2. However, N=100 histogram bins in FIG. 3. In particular, Images 300' through 302' illustrate histograms of a single 1D line and of a 2D frame of retinal SDOCT data evaluated for N=100 histogram bins, Image data; 300': 1D line of data from the indicated position in 200' with the max (dash), mean (solid), and median (dot-dash) marked; 301': Histogram of the 1D line with the mean (solid), median (dash), and centroid (dot-dash) of the 1D histogram indicated; and 302': Histogram of the 2D image data with the mean (solid), median (dash), and centroid (dot-dash) of the histogram of the frame of data indicated.

Figure 4:
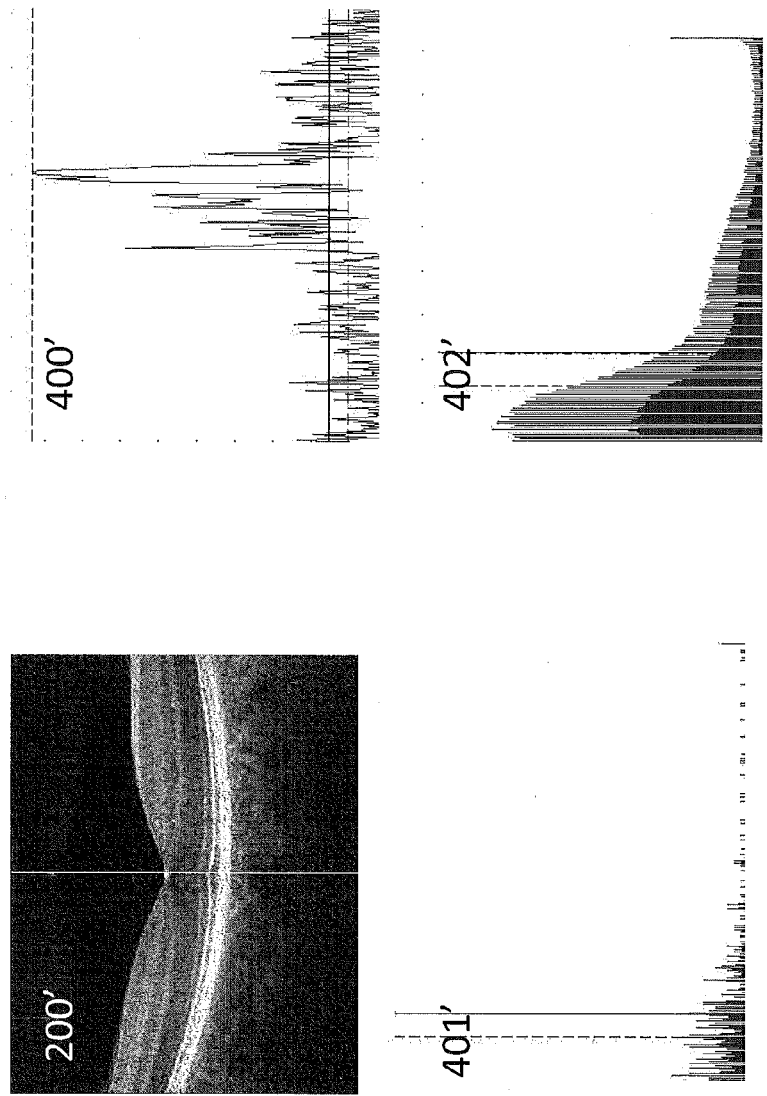
FIG. 4 illustrates graphs showing histograms similar to those illustrated in FIG. 2, however in FIG. 4, N=1000 histogram bins.

The images in FIG. 4 are also used in the histogram evaluation. The images in FIG. 4 are similar to the images 200'-203' in FIG. 2. However, N=1000 histogram bins in FIG. 4. Images 400' through 402' illustrate histograms of a single 1D line and of a 2D frame of retinal SDOCT data evaluated for N=1000 histogram bins, Image data; 400': 1D line of data from the indicated position in 200' with the max (dash), mean (solid), and median (dot-dash) marked; 401': Histogram of the 1D line with the mean (solid), median (dash), and centroid (dot-dash) of the 1D histogram indicated; and 402': Histogram of the 2D image data with the mean (solid), median (dash), and centroid (dot-dash) of the histogram of the frame of data indicated.

Figure 5:
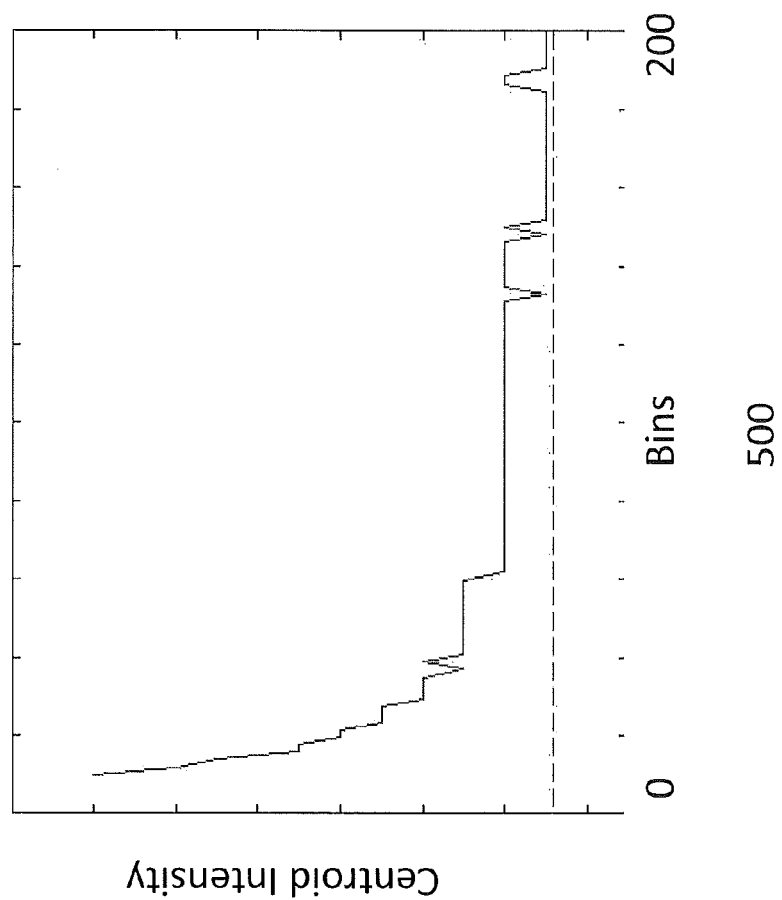
FIG. 5 is a graph illustrating number of bins vs. centroid density of the histogram, as the number of bins in the histogram increases; the centroid value of the histogram approaches the average intensity value.

FIG. 5 is a graph illustrating histogram centroid convergence on mean. In particular, as the number of bins in the histogram increases, the centroid value of the histogram approaches the average intensity value.

Figure 6:
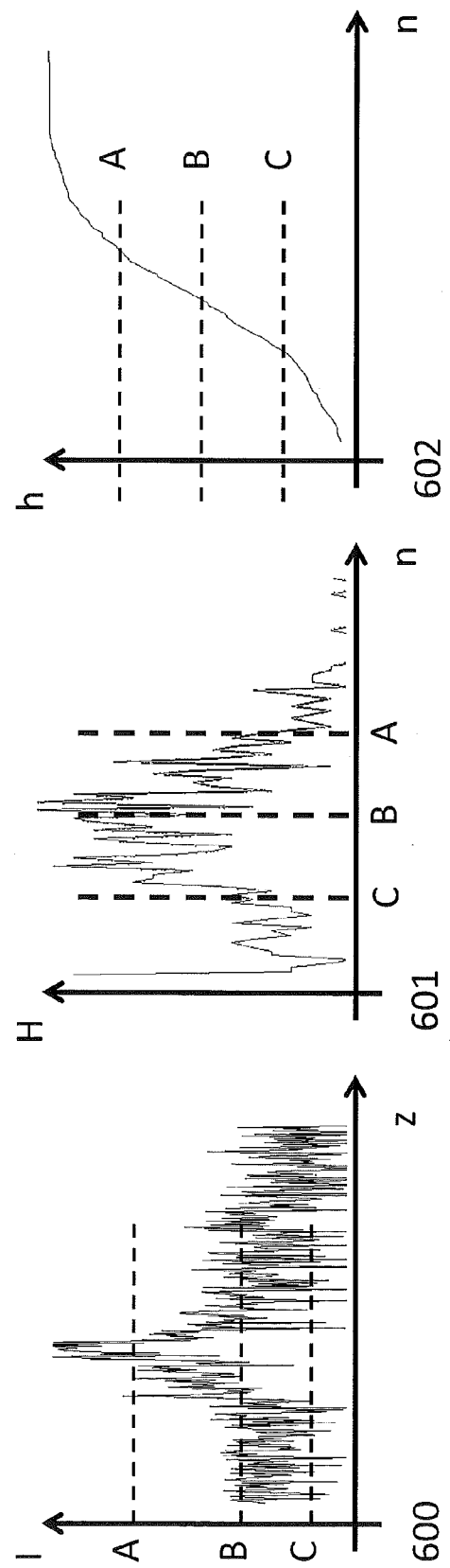
FIG. 6 illustrates a series of diagrams illustrating an A-Scan with approximate values as selected by Cumulative Distribution Function of the histogram marked; a Histogram of the A-Scan in (600) with CDF lines marked; and cumulative distribution function (CDF) of the histogram in (601) with threshold levels marked.

The images 600-602 of FIG. 6 are charts illustrating pixel selection based on CDF. Image 600 illustrates an A-Scan with approximate values as selected by CDF of the histogram marked; Image 601 illustrates a histogram of the A-Scan in (A) with CDF lines marked; and Image 602 illustrates a CDF of the histogram in (B) with threshold levels marked.

The images 700-702 illustrate histogram-based projections. Image 700 illustrates a histogram-centroid projection; Image 701 illustrates a median projection; and Image 702 illustrates a 75% of CDF maximum projection.

The diagrams 800-802 illustrate alternate projection methods. In particular, it may be possible to generate a projection through the data volume that uses the pixel values from multiple A-Scans (multiple X-Y positions) to generate a single pixel on the projection map. Diagram 800 illustrates that each pixel value on the map may be generated through angled projections through the volumetric data, where in the axis or direction of the projection is different for each X-Y position, and also different for each pixel of the map. In fact, each axis is unique and there is a one-to-one mapping between X-Y positions of the sample and directions, and many-to-one or one-to-one mapping between each of the directions and each pixel on the projection; Diagram 801 illustrates that multiple adjacent A-Scans from geographically unique locations along the lateral dimension (x) may be operated upon to generate a single A-Scan that can be used in further projections; and Diagram 802 illustrates that multiple adjacent A-Scans from geographically unique locations along the lateral and elevation dimensions (x, y) may be operated upon to generate a single A-Scan that can be used in further projections.

Images 900-903 illustrate mixed projection methods. Through the operation on multiple geographically unique A-Scans, it may be possible to generate A-Scans that contain regional information and to then generate a projection using those A-Scans. Images 900 and 901 illustrate projection using average intensity (900) and median intensity (901) provided for comparison; Image 902 illustrates a median filter applied to clusters of adjacent A-Scans in the lateral (x) dimension using a moving window and then an average value of the resultant A-Scans is used to generate the projection map; and Image 903 illustrates the same method that was used as that in (902) with a A-Scan window.

Images 1000-1001 illustrate image enhancement with histogram equalization. Image 1000 illustrates a projection map generated using the 85% of CDF maximum value; and Image 1001 illustrates the map in (1000) with all lines along the lateral (x) axis equalized using the histogram of the center line in elevation (indicated in (1000)).

Some embodiments discussed herein explore variations on the standard average intensity and maximum intensity projections. In particular, in some embodiments histogram-based operations including the median intensity as a function of depth are evaluated to determine their efficacy in producing an adequate en-face projection of volumetric, retinal spectral domain optical coherence tomography (SDOCT) data. It will be understood that although techniques discussed herein are described predominantly using projections along the depth (z) dimension, embodiments of the present inventive concept are not limited to this configuration. For example, projections using the same techniques or similar along the lateral (x), elevation (y), or temporal (t) dimensions may also be generated and may produce interesting representations of the volumetric data. The volume could consist of, for example, M-Scans, i.e., stationary beam with A-Scans representing changes as a function of time rather than position. Furthermore, similar methods may be applied to information other than structural content, including Doppler and polarization information, to generate unique representations of those data sets.

FIGS. 2 through 4 illustrate the histogram of both a 1D line and of the whole 2D frame of image data. The centroid of the histogram, for low bin numbers, is a unique representation of the intensity along the ray cast along the depth dimension. In some embodiments, the histogram is calculated by counting the number of pixel values $p(x,z)$ that fall into unique bins and/or subsets of pixel values with the lowest value of the first bin being zero (0) and the largest value of the last bin being the maximum value in the data set being analyzed. The 1D histogram H with bins $n_1 \ldots n_N$ and maximum bin number N has a centroid value $\bar{n}$ defined by Equation 1 set out below:

$$\bar{n} = \frac{\sum_{i=1}^{N} H_i(n) * n_i}{\sum_{i=1}^{N} H_i(n)} \quad \text{[Equation 1]}$$

The centroid calculation can be extended to 2D and higher to find the centroid of a regional (greater than 1D) histogram. Using Equation 2, the bin value $\bar{n}$ can be converted to the actual value used in the projection P (x,y) using the total number of bins N:

$$P(x, y) = \bar{n} * \frac{\max(p(x, z))}{N} \quad \text{[Equation 2]}$$

As can be seen in FIGS. 2-4 and FIG. 5, as the number of bins used to calculate the histogram of the 1D line increases, the centroid of the histogram approaches the average intensity value of the 1D line. The centroid is thus a unique value related to, but not equal to, the average intensity value for small bin numbers.

The median value is an interesting metric for representing the pixel intensity values along an A-Scan. FIG. 6 illustrate an A-Scan I and its corresponding histogram, H. The cumulative distribution function (CDF) illustrated in 602 of FIG. 6 calculated from the histogram in 601 in FIG. 6 may be used to select the pixel value used in the projection. The CDF h is calculated using Equation 3 set out below:

$$h(n) = \Sum_{i=1}^{n} H(i) \quad \text{[Equation 3]}$$

The 50% CDF value represents the median intensity value. As the CDF represents the total integrated counts across multiple intensity levels, fractions of the CDF maximum value may be used to weight the projection to represent high or low intensity regions within the volume.

FIG. 7 illustrates the projection when the centroid of the histogram of each A-Scan is used as the projection value along each line, the projections using 50% CDF maximum (median) and 75% CDF maximum along each A-Scan.

In some embodiments of the present inventive concept, integrated ranges or aggregations of multiple ranges may be used along the CDF to generate the value in the projection map $P(x,y)$. In these embodiments of this functional manipulation of the CDF, a value K may be a weighted summation or other combination of ranges along the CDF as illustrated by Equation 4:

$$K(J,U,V) = \Sum_{j=1}^{J} w(j, U(j), V(j)) \Sum_{i=U(j)}^{V(j)} h(i) \quad \text{[Equation 4]}$$

where w(j) represents the weighting function used for each range, U(j) and V(j) represent lower and upper bound arrays that define the ranges of each subset to process, and J represents the total number of subsets to process to determine the value K.

Non-surface normal projections or projections along an axis not parallel to the A-Scan axis are possible as well. Integration or histogram-based projection value selection through the volume at an angle to the A-Scan axis would provide a representation of the data that may accentuate details not visible in the standard AIP. Each unique pixel value $P(x,y)$ in the projection map is derived through an operation R on a ray of pixel values $A(r, \theta, \phi)$ as illustrated in FIG. 8 (800) and represented by Equation 5 set out below:

$$P(x,y) = R(A(r,\theta,\phi)) \quad \text{[Equation 5]}$$

It may be possible to combine or operate upon adjacent A-Scans in either the lateral or elevation dimensions (or both) to generate new, virtual A-Scans that are an aggregate of the information from multiple locations. The new A-Scans do not directly represent any single A-Scan or (x, y) pixel location in the image, but rather represent regional pixel information.

Figure 8:
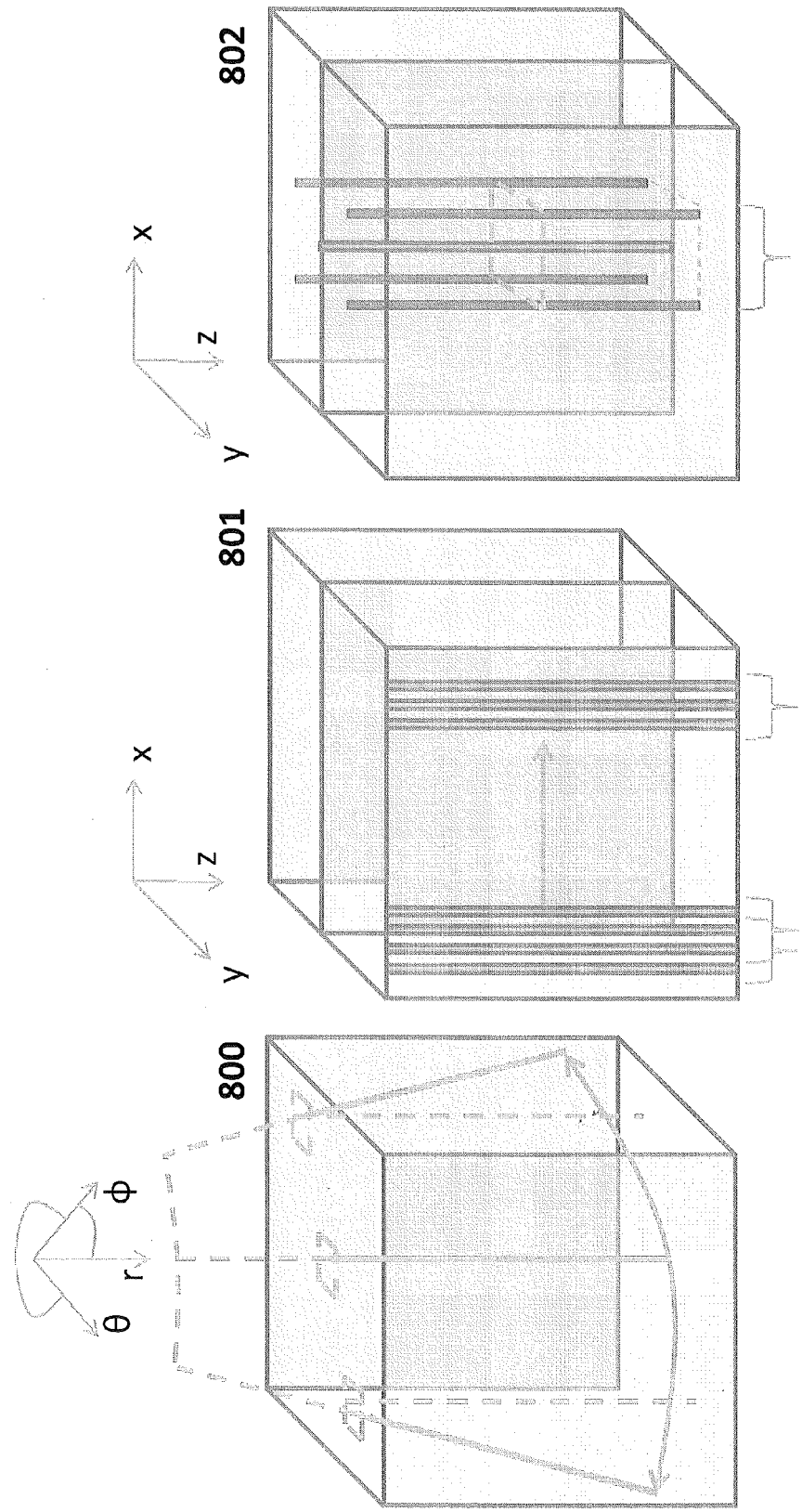
FIG. 8 illustrates diagrams illustrating the possibility of generating a projection through the data volume that uses the pixel values from multiple A-Scans to generate a single pixel on the projection map, Image 800 illustrates a graph illustrating that each pixel value on the map may be generated through angled projections through the volumetric data; Image 801 illustrates that multiple adjacent A-Scans from geographically unique locations along the lateral dimension (x) may be operated upon to generate a single A-Scan that can be used in further projections; and Image 802 illustrates that Multiple adjacent A-Scans from geographically unique locations along the lateral and elevation dimensions (x, y) may be operated upon to generate a single A-Scan that can be used in further projections.

In some embodiments, clusters of two or more A-Scans may be examined and a filter may be applied to generate a unique A-Scan composed of the filter value from all A-Scans in the cluster at each depth location as illustrated in FIG. 8 (801) and represented by Equation 6:

$$A(x,z)_m = H(A(x,z)_m : A(x,z)_{m+M}) \quad \text{[Equation 6]}$$

Figure 9:
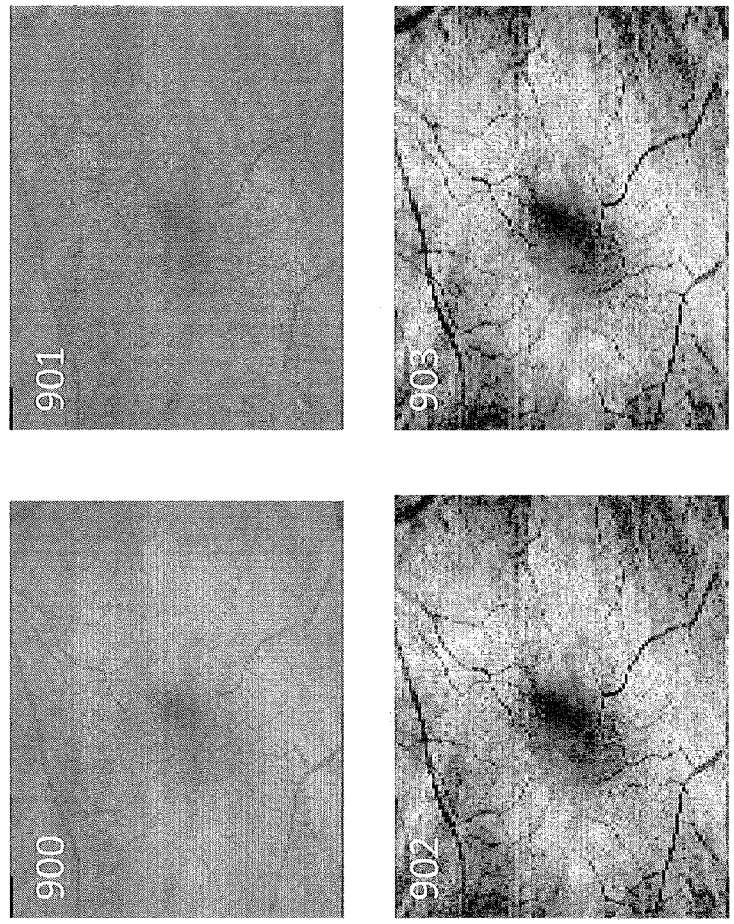
FIG. 9 illustrates images illustrating mixed projection methods. Through the operation on multiple geographically unique A-Scans, it is possible to generate A-Scans that contain regional information and to then generate a projection using those A-Scans. Images 900 and 901 illustrate Projection using average intensity (900) and median intensity (901) provided for comparison; Image 902 illustrates a median filter applied to clusters of 3 adjacent A-Scans in the lateral (x) dimension using a moving window and then average value of the resultant A-Scan used to generate the projection map; and Image 903 illustrates a similar method to that used in (902) with a 5 A-Scan window.

FIG. 9 illustrates the projection obtained when the filter function H(x) is the median filter and the number of lines used is 3(902) and 5(903). The average intensity is then calculated along each A-Scan A(x,z) to generate the pixel value P(x,y) for each location in the projection map. Images 900 and 901 of FIG. 9 are the average intensity projection (900) and the median intensity projection (901) and are provided for comparison.

To extend this concept, multiple A-Scans in a two dimensional region around a geographically or temporally unique A-Scan may be operated upon to generate a unique A-Scan that is representative of regional information in multiple dimensions as illustrated in diagram 802 of FIG. 8 and represented by Equation 7 set out below:

$$A(x,z)_m = H(A(x,y,z)_{m,n} : A(x,y,z)_{m+M,n+N}) \quad \text{[Equation 7]}$$

This technique may benefit from isotropic sample densities, i.e. equal numbers of lines per frame and frames per volume.

Figure 10:
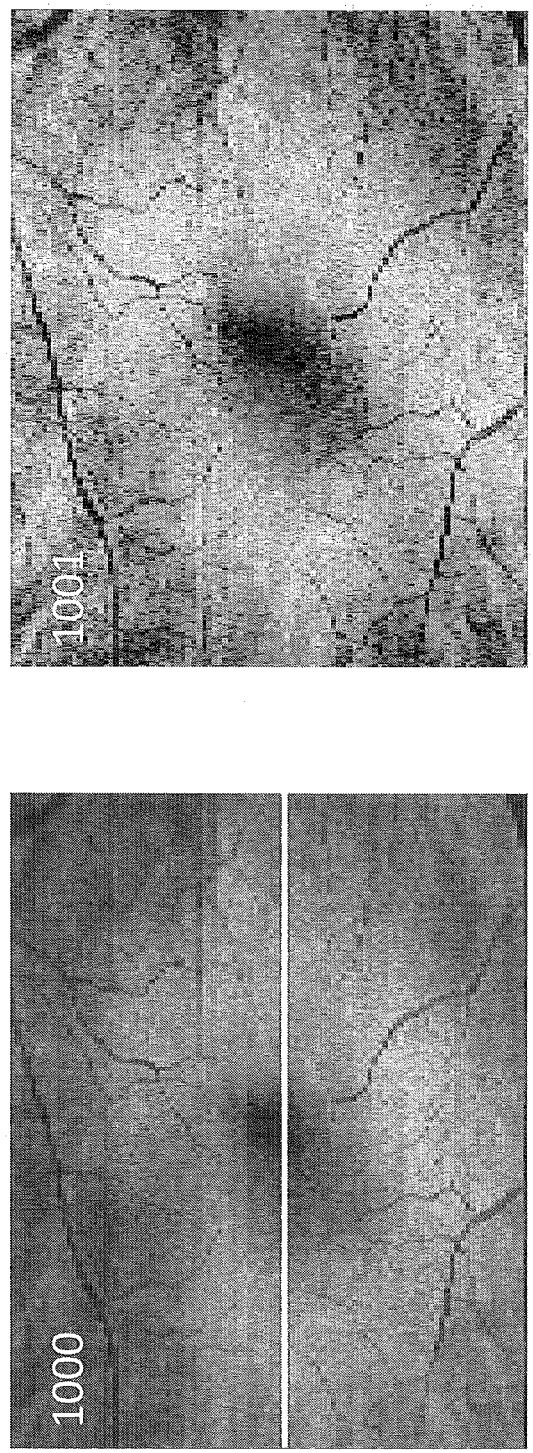
FIG. 10 illustrates image enhancement with histogram equalization, Image 1000 illustrates a Projection map generated using the 85% of CDF maximum value; and Image 1001 illustrates the map in (1000) with all lines along the lateral (x) axis being equalized using the histogram of the center line in elevation (indicated in (1000)).

In some embodiments, methods of enhancing the projection image may include normalizing the histogram of each line in the projection, along either the lateral or elevation dimension, to a fixed (or adaptively selected) line in the projection map. This may reduce or possibly eliminate line-to-line intensity fluctuations in the map due to select images with lower intensity and/or other image artifacts. The images in FIGS. 7 and 9 have all been equalized using this method. FIG. 10 illustrates the direct result of equalizing the histogram of all lines against the histogram of the middle line in the lateral dimension.

Figure 11:
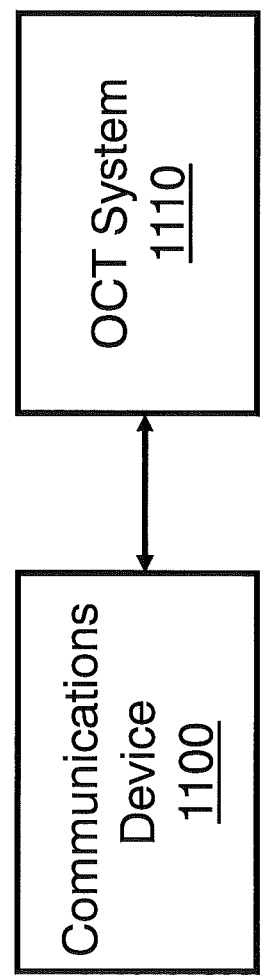
FIG. 11 is a block diagram of a optical coherence tomography system in accordance with some embodiments of the present inventive concept.

Referring now to FIG. 11, a system in accordance with some embodiments of the present inventive concept will be discussed. As illustrated in FIG. 11, the system may include a communications device 1100 and an OCT system 1110. The communications device 1100 may include the data processing system discussed below with respect to FIG. 12. The communications device 1100 may used to process and display the scan patterns as discussed above with respect to FIG. 2 through 10.

The OCT system 1110 may be, for example, a spectral domain OCT system in some embodiments. The OCT system 1110 may include a reference arm, sample arm (scanning device), engine, etc.

It will be understood that the system illustrated in FIG. 11 is provided for exemplary purposed only and, therefore, embodiments of the present inventive concept are not limited to the system illustrated therein.

Figure 12:
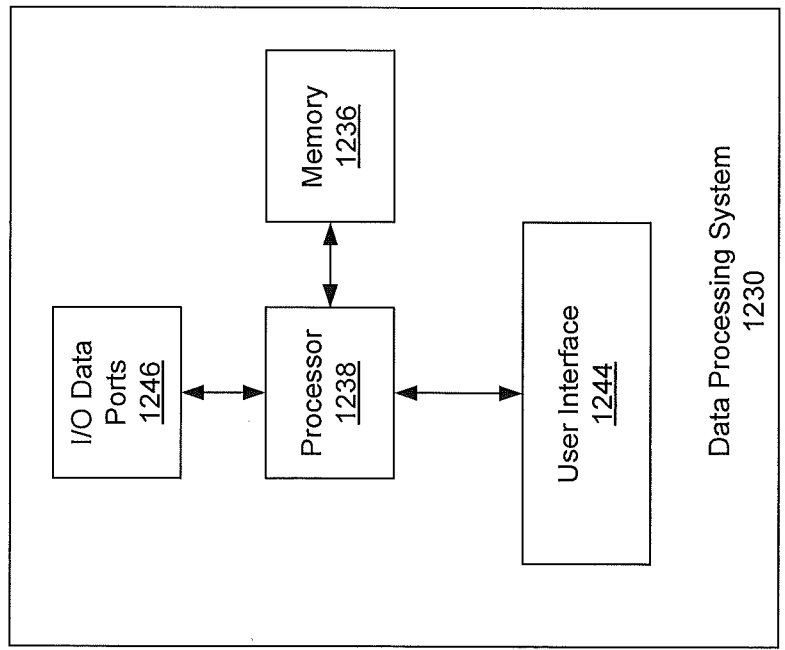
FIG. 12 is a block diagram of a data processing system suitable for use in some embodiments of the present inventive concept.

Exemplary embodiments of a data processing system 1230 configured in accordance with embodiments of the present inventive concept will be discussed with respect to FIG. 12. The data processing system may be included as part of the communications device 1200 of FIG. 12. The data processing system 1230 may include a user interface 1244, including, for example, input device(s) such as a keyboard or keypad, a display, a speaker and/or microphone, and a memory 1236 that communicate with a processor 1238. The data processing system 1230 may further include I/O data port(s) 1246 that also communicates with the processor 1238. The I/O data ports 1246 can be used to transfer information between the data processing system 1230 and another computer system or a network using, for example, an Internet Protocol (IP) connection. These components may be conventional components such as those used in many conventional data processing systems, which may be configured to operate as described herein.

Example embodiments are described above with reference to block diagrams and/or flowchart illustrations of methods, devices, systems and/or computer program products. It is understood that a block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means (functionality) and/or structure for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the functions/acts specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, example embodiments may be implemented in hardware and/or in software (including firmware, resident software, micro-code, etc.). Furthermore, example embodiments may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of data processing systems discussed herein may be written in a high-level programming language, such as Java, AJAX (Asynchronous JavaScript), C, and/or C++, for development convenience. In addition, computer program code for carrying out operations of example embodiments may also be written in other programming languages, such as, but not limited to, interpreted languages. Some modules or routines may be written in assembly language or even micro-code to enhance performance and/or memory usage. However, embodiments are not limited to a particular programming language. It will be further appreciated that the functionality of any or all of the program modules may also be implemented using discrete hardware components, one or more application specific integrated circuits (ASICs), or a field programmable gate array (FPGA), or a programmed digital signal processor, a programmed logic controller (PLC), microcontroller or graphics processing unit.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated.

In the drawings and specification, there have been disclosed exemplary embodiments of the inventive concept. However, many variations and modifications can be made to these embodiments without substantially departing from the principles of the present inventive concept. Accordingly, although specific terms are used, they are used in a generic and descriptive sense only and not for purposes of limitation, the scope of the inventive concept being defined by the following claims.

That which is claimed is:

1. A method of collapsing volume data to a lower dimensional representation or the volume data, the method comprising:
   collapsing volume data to a lower dimensional representation of the volume data using histogram projection;
   examining clusters of two or more A-Scans; and
   filtering the examined clusters to generate a unique A-Scan composed of a filter value from all A-Scans in the examined clusters at each depth (z) location of the A-Scan.

2. The method of claim 1, further comprising calculating an average intensity along each A-Scan $A(x,z)$ to generate a value $P(x,y)$ for each location in a projection map.

3. The method of claim 1, wherein integrated ranges or aggregations of multiple ranges are used along the CDF generated from filtered A-Scans to generate a value in a projection map $P(x,y)$.

4. The method of claim 1, further comprising calculating the histogram by counting a number of pixel values $p(x,z)$ that fall into unique bins and/or subsets of pixel values, wherein a lowest value of a first bin is zero and a largest value of a last bin is a maximum value in a data set being analyzed.

5. The method of claim 4, further comprising:
   calculating a cumulative distribution function (CDF) from the histogram; and
   selecting the pixel value used in the projection based on the calculated CDF.

6. The method of claim 5, wherein a 50 percent CDF value represents a median intensity value.

7. The method of claim 5, wherein the CDF represents a total number of integrated counts across multiple intensity levels and wherein fractions of the CDF maximum value are used to weight the projection to highlight high or low intensity regions within the volume data.

8. The method of claim 5, wherein integrated ranges or aggregations of multiple ranges are used along the CDF to generate a value in a projection map $P(x,y)$.

9. The method of claim 4, further comprising generating virtual A-Scans based on adjacent A-Scans in 1 or more dimensions, the virtual A-Scans being an aggregate of information from multiple locations to provide regional pixel information.

10. The method of claim 4, further comprising generating virtual A-Scans based on angular projects through the volume, the virtual A-Scans being an aggregate of the information contained along each projection angle.

11. The method of claim 10, further comprising calculating an average intensity along each A-Scan (x,y) to generate a value P(x,y) for each location in a projection map.

12. The method of claim 10, wherein integrated ranges or aggregations of multiple ranges are used along the CDF generated from virtual A-Scans to generate a value in a projection map P(x,y).

13. The method of claim 4, further comprising generating a unique A-Scan representing region information in both the lateral (x) and elevation (y) dimensions based on multiple A-Scans in a two dimensional region around a geographically or temporally unique A-Scan.

14. A system for collapsing volume data to a lower dimensional representation of the volume data, the system comprising:
   an optical coherence tomography system; and
   a volume data processor coupled to the optical coherence tomography system, the volume data processor being configured to:
   collapse volume data to a lower dimensional representation of the volume data using histogram projection;
   examine clusters of two or more A-Scans; and
   filter the examined clusters to generate a unique A-Scan composed of a filter value from all A-Scans in the examined clusters at each depth (z) location of the A-Scan.

15. The system of claim 14, wherein the optical coherence tomography system comprises a spectral domain optical coherence tomography system.

16. The system of claim 15, wherein the spectral domain coherence tomography system comprises:
   a reference arm;
   a sample arm coupled to the reference arm and a communications device, the sample arm configured to scan a sample; and
   an optical coherence tomography engine coupled to the communications device.

17. A computer program product for collapsing volume data to a lower dimensional representation of the volume data, the computer program product comprising:
   a non-transistory computer readable storage medium having computer readable program code embodied in said medium, the computer readable program code comprising:
   computer readable program code configured to collapse volume data to a lower dimensional representation of the volume data using histogram projection;
   computer readable program code configured to examine clusters of two or more A-Scans; and
   computer readable program code configured to filtering the examined clusters to generate a unique A-Scan composed of a filter value from all A-Scans in the examined clusters at each depth (z) location of the A-Scan.

18. The computer program product of claim 17, further comprising computer readable program code configured to calculate the histogram by counting a number of pixel values p(x,z) that fall into unique bins and/or subsets of pixel values, wherein a lowest value of a first bin is zero and a largest value of a last bin is a maximum value in a data set being analyzed.

19. The computer program product of claim 18, further comprising:
   computer readable program code configured to calculate a cumulative distribution function (CDF) from the histogram; and
   computer readable program code configured to select the pixel value used in the projection based on the calculated CDF.

* * * * *

UNITED STATES PATENT AND TRADEMARK OFFICE
CERTIFICATE OF CORRECTION

PATENT NO.        : 8,744,159 B2
APPLICATION NO.   : 13/040923
DATED             : June 3, 2014
INVENTOR(S)       : Bower et al.

It is certified that error appears in the above-identified patent and that said Letters Patent is hereby corrected as shown below:

In the Specification:

Column 7, Line 30: Please replace Equation 4 below:

$$K(J,U,V) = \Sigma_{j=1}^{J} w(j, U(j)), V(j)) \Sigma_{i=U(j)}^{V(j)} h(i) \quad \text{[Equation 4]}$$

to read as:

$$K(J,U,V) = \sum_{j=1}^{J} w(j, U(j), V(j)) \sum_{i=U(j)}^{V(j)} h(i) \quad \text{[Equation 4]}$$

Signed and Sealed this
Twenty-first Day of April, 2015

Michelle K. Lee
*Director of the United States Patent and Trademark Office*